US008348565B2

(12) United States Patent
Khalil et al.

(10) Patent No.: US 8,348,565 B2
(45) Date of Patent: Jan. 8, 2013

(54) RIVET

(75) Inventors: Ziad Khalil, Braunau am Inn (AT); Sumanjit Singh, Gaimersheim (DE)

(73) Assignee: Sumanjit Singh, Gaimersheim (DE)

( * ) Notice: Subject to any disclaimer, the term of this patent is extended or adjusted under 35 U.S.C. 154(b) by 616 days.

(21) Appl. No.: 12/516,993

(22) PCT Filed: Nov. 28, 2007

(86) PCT No.: PCT/EP2007/010317
§ 371 (c)(1),
(2), (4) Date: Aug. 31, 2009

(87) PCT Pub. No.: WO2008/064875
PCT Pub. Date: Jun. 5, 2008

(65) Prior Publication Data
US 2010/0068001 A1    Mar. 18, 2010

(30) Foreign Application Priority Data
Nov. 30, 2006  (AT) ................. A 1987/2006

(51) Int. Cl.
*F16B 13/04*  (2006.01)
(52) U.S. Cl. ................. 411/34; 411/42; 411/73
(58) Field of Classification Search ............ 411/34, 411/35, 38, 42, 73
See application file for complete search history.

(56) References Cited

U.S. PATENT DOCUMENTS

| | | | | |
|---|---|---|---|---|
| 2,324,142 A | | 7/1943 | Eklund | |
| 2,887,003 A | * | 5/1959 | Brilmyer | 411/34 |
| 3,065,661 A | * | 11/1962 | Kolec et al. | 411/41 |
| 3,107,572 A | * | 10/1963 | Orloff | 411/34 |
| 3,178,989 A | * | 4/1965 | Siebol | 411/38 |
| 3,230,818 A | * | 1/1966 | Siebol | 411/34 |
| 3,348,444 A | * | 10/1967 | Brignola | 411/38 |
| 4,237,768 A | | 12/1980 | Volkmann | |
| 4,810,141 A | | 3/1989 | Rainville | |
| 4,875,815 A | * | 10/1989 | Phillips, II | 411/38 |
| 5,030,050 A | * | 7/1991 | Auriol et al. | 411/38 |
| 5,248,231 A | * | 9/1993 | Denham et al. | 411/43 |
| 5,503,510 A | * | 4/1996 | Golan | 411/43 |
| 5,759,001 A | * | 6/1998 | Smith | 411/43 |
| 2002/0119024 A1 | * | 8/2002 | Jennings et al. | 411/38 |

(Continued)

FOREIGN PATENT DOCUMENTS

| | | |
|---|---|---|
| CH | 486 644 | 4/1970 |
| EP | 0 398 403 | 4/1990 |
| EP | 1 369 601 | 10/2006 |
| GB | 1 604 502 | 5/1978 |

*Primary Examiner* — Roberta Delisle
(74) *Attorney, Agent, or Firm* — Greenblum & Bernstein, P.L.C.

(57) ABSTRACT

The invention relates to a rivet (2) for connecting workpieces (11, 12), in particular a blind rivet, having a sleeve (1) with a shank (5) and a widened preformed head (13) adjoining thereto, and optionally a rivet mandrel (8) with a head (9), wherein an end of the shank (5) lying opposite the preformed head (13) if necessary can be deformed to form a driven head by drawing the rivet mandrel (8) into the sleeve (1). In order that during the placement of a rivet (2) a gap (10) between the rivet (2) and workpieces (11, 12) to be connected can be closed and a highly loadable connection can be achieved, at least one indentation (3) running axially and/or at least one slot running axially are provided in the shank (5), which indentation (3) or which slot (4) during the placement of the rivet (2) causes a radial expansion of the shank (5) of the sleeve (1) towards the workpieces (11, 12).

20 Claims, 3 Drawing Sheets

U.S. PATENT DOCUMENTS

2003/0123949 A1* 7/2003 Eshraghi ................. 411/71
2003/0215303 A1* 11/2003 Makino .................. 411/39
2004/0071525 A1 4/2004 Millington
2005/0201844 A1* 9/2005 Davies et al. ............ 411/34

* cited by examiner

RIVET

CROSS-REFERENCE TO RELATED APPLICATIONS

The present application is a U.S. National Stage of International Patent Application No. PCT/EP2007/010317 filed Nov. 28, 2007, and claims priority under 35 U.S.C. §119 and 365 of Austrian Patent Application No. A 1987/2006 filed Nov. 30, 2006. Moreover, the disclosure of International Patent Application No. PCT/EP2007/010317 is expressly incorporated by reference herein in its entirety.

BACKGROUND OF THE INVENTION

1. Field of the Invention

The invention relates to a rivet for connecting workpieces, in particular a blind rivet, having a sleeve with a shank and a widened preformed head and optionally a rivet mandrel with a head. An end of the shank lying opposite the preformed head can be deformed to form a driven head by drawing the rivet mandrel into the sleeve.

2. Discussion of Background Information

When it is a matter of connecting metal sheets or plates to one another, rivets often represent the connecting elements of choice. This applies in particular when parts made of different materials are to be connected to one another and a welding, soldering or adhering is not possible or leads only to unsatisfactory results. As a result, rivets with which heavily loadable, durable connections can be achieved are primarily in demand.

In a very simple and customary form, rivets are embodied in one part as sleeve-shaped hollow rivets with a hollow shank and a widened preformed head connecting thereto. To embody a placed rivet, it is then necessary only to deform the end of the shank lying opposite the preformed head through the application of force to form a driven head. Rivets of this type are also used in particular for connecting non-metallic materials. However, this is possible only when the workpieces are accessible from both sides. Otherwise, one must rely on blind rivets.

Blind rivets are constructed in a multiple-part manner. On the one hand, a blind rivet similar to a pop rivet comprises a sleeve with a hollow shank, which at one end has a widened preformed head. On the other hand, a blind rivet in addition requires a rivet mandrel, so that a driven head can be formed despite restricted accessibility to the workpieces on one side. The rivet mandrel is shaped cylindrically, for example, and has a widened head, the outer diameter of which corresponds at most to an outer diameter of the shank. The rivet mandrel is thereby dimensioned such that it can be inserted into the hollow shank of the sleeve and drawn in through it. The rivet can then be inserted and placed from one side. During placement, the widened head of the rivet mandrel comes to bear against the end of the sleeve lying opposite the preformed head and deforms this end to form a driven head due to the tensile force applied or a force acting on the shank.

A use of rivets of this type for producing connections between workpieces presupposes that corresponding bores for accommodating the rivets are inserted into the workpieces. These bores should be sized such that after placement a shank of the sleeve bears against the bore walls over the whole surface as far as possible. Otherwise, if this is not the case, the workpieces have a play towards the shank or the sleeve, which with higher thrust forces means that the rivet connection is loosened and ultimately fails prematurely, in particular with alternating loads.

However, problems arise with reference to this need for a production as exact as possible of bore diameters to accommodate a sleeve: one particular problem is that it is difficult to insert bores into various workpieces when the bore diameters are to differ only within a permissible tolerance of a few hundreds of a millimeter, in particular when they the workpieces comprise different materials. This problem becomes evident in particular when for individual constructions, for example, in aircraft construction, many thousands of rivets are to be placed and accordingly many bores are to be provided.

In the case of blind rivets, the above problem is even more severe. As mentioned, blind rivets are used when the workpieces to be connected are accessible from only one side. In order for it to be possible to insert rivets of this type into the bores before placement, an outer diameter of the head of a rivet mandrel may correspond at most to a maximum outer diameter of the shank of the sleeve. For this reason a diameter of the rivet mandrel head is limited, which can have an unfavorable effect on a non-positive closure between the workpieces (low surface pressure). With loads, a release of a connection is therefore more easily possible and an exact production of bore diameters is all the more important.

To solve the above problem it has already been suggested to ream out bores and thus to bring them to approximately the same diameter. Although this can be seen as a useful approach in order to achieve connections with higher loading capacity, it is a disadvantage that reaming operations require a high labor expenditure and in particular in customary fields of application for rivets, for example, in aircraft construction, therefore appear to be extremely impractical.

SUMMARY OF THE INVENTION

Based on the prior art, embodiments of the invention are directed to a rivet of the type mentioned at the outset, with which the problem of a play between sleeve and workpieces after placement of the rivet is avoided or at least largely reduced.

The embodiments of the invention relate to a rivet with which the problem of a play between sleeve and workpieces after placement of the rivet is avoided or at least largely reduced is attained. The embodiments include a generic rivet having at least one indentation running axially and/or at least one slot running axially in the shank so that, during the placement of the rivet, a radial expansion of the shank of the sleeve towards the workpieces occurs.

Advantageously, during the placement of the rivet according to the embodiments, a gap between sleeve and workpieces can be bridged. Due to the provided indentation running axially or the slot of the same type, a shank has a reduced dent resistance and buckling resistance compared to known solutions. If now, for example, a force is applied to the sleeve during the placement of a blind rivet over a head of a rivet mandrel, it is deformed radially outwards due to a reduced dent resistance and buckling resistance. In this manner, the sleeve comes to bear against the workpieces and gaps between sleeve and workpieces are bridged.

Simultaneously and/or subsequently, the application of a force to the end of the sleeve in the known manner ensures the formation of a driven head. Thus with the use of a rivet according to the invention, on the one hand the formation of a non-positive connection occurs through which the workpieces are held together. The targeted buckling of the shank associated with the placement operation, on the other hand, simultaneously produces a direct connection between workpieces and shank. A lateral displacement of the workpieces with load is therefore prevented and a loading capacity of a rivet connection therefore increased.

The at least one indentation and/or the at least one slot can be arranged on the outside of the shank. This is advisable in particular with shanks with small diameters, since in this case indentations or slots can be formed in the sleeve much more easily on the outside than on the inside.

However, it can likewise be provided that the indentation and/or the slot are arranged on the inside. An inside arrangement of indentations/slots has the advantage that a dent resistance and buckling resistance of the shank is reduced, but at the same time an outer surface of the shank via which a contact to the workpieces is produced, remains unchanged in terms of area.

A number of the indentations and/or slots is variable and can be adapted depending on the mechanical properties of the material used. It is expedient that the shank has at least two, in particular three or more, indentations and/or slots in order to promote a deformability of the same.

In order to cause a uniform expansion of the shank over the entire cross section of the same, several indentations and/or slots can be provided, which run parallel to the sleeve axis and are preferably arranged around it in a rotationally symmetrical manner.

In order for the effects of a reduced dent resistance and buckling resistance to be particularly effective, the indentations and/or slots run approximately from that area in which the shank connects to the preformed head. It can be preferred for the indentations and/or the slots essentially to run over only that area of the shank that is not required for forming a driven head.

It can furthermore be favorable that the sleeve has on the outside at least one predetermined breaking point preferably running radially circumferentially such that an end part of the sleeve can be displaced axially around a remaining part of the sleeve through action of a force in the direction of the sleeve axis. When this structural measure is provided, the sleeve is broken during the placement of a rivet, the end piece is pushed over the remaining part of the sleeve and, when the rivet mandrel is drawn in further, even before the formation of a driven head, a force is exerted on the workpieces so that they are pushed together and any vertical gap between the workpieces is closed. After the vertical gap between the workpieces is closed, a buckling of the sleeve takes place due to the provided indentations and/or slots, so that the sleeve bears against the workpieces. In addition a driven head is formed. The result is a particularly loadable and durable connection, since a vertical play between the workpieces as well as a lateral play between the workpieces and sleeve is eliminated.

Alternatively thereto it can also be provided that the sleeve has on the outside at least one predetermined deformation point preferably running radially circumferentially such that an end part of the sleeve can be deformed around the remaining part of the sleeve with the formation of a truncated cone through the action of a force in the direction of the sleeve axis. With this construction, during the placement of a rivet the truncated cone formed ensures that the workpieces are moved together and thus a vertical gap between the workpieces is closed.

With the embodiment of a rivet with a rivet mandrel it is particularly preferred if the rivet mandrel has ribs on the outside, which radially expand the sleeve when the rivet mandrel is drawn in. An expansion of the sleeve during placement of the rivet and thus a good surface pressure between the workpieces and the sleeve is thereby additionally supported. In addition, in this case there is also a high surface pressure between the sleeve and the rivet mandrel, so that there is a high surface pressure on the workpieces/sleeve connecting surfaces as well as the sleeve/rivet mandrel connecting surfaces. This is also promoted in that during the expansion of the sleeve, as soon as it abuts against the workpieces, sleeve material can flow in between the ribs of the rivet mandrel, which additionally can cause a strain-hardening effect.

If rivet mandrels with outside ribs are used, a load-bearing capacity of the connection can be increased still further if the rivet mandrel is embodied in a solid manner and thus can withstand very high loads.

Expediently, with the use of rivet mandrels with outside ribs and with a shank with several indentations and/or slots, the individual parts of the rivet are assembled such that the ribs bear against the sleeve in areas between the indentations and/or slots. The effects obtained through the indentations and/or slots and the ribs can thus develop their full effect.

In particular for a blind rivet, the individual parts of which have to be inserted already assembled into the bores, it is advisable that the sleeve has on the end guide lugs for the ribs. The rivet mandrel can then be clamped in the sleeve with low force and inserted into the bores with desired positioning of sleeve and rivet mandrel.

The ribs preferably connect on the head of the rivet mandrel so that in the placed state of the rivet they can extend over the full length of the bores. In order to keep a tensile force for drawing in a rivet mandrel as low as possible, it can also be provided for the ribs to be embodied in a wedge-shaped manner. In this respect it is expedient that the ribs are embodied with a contour running per se parallel to the rivet mandrel, to which contour towards the preformed head a wedge-shaped section or wedge surfaces adjoin.

Further advantages and effects of the invention result from the context of the specification and the following exemplary embodiments. It is obvious to one skilled in the art that individual features of the following exemplary embodiments, even if they are cited in combination with other features, can be combined with the general teaching of the invention set forth above.

BRIEF DESCRIPTION OF THE DRAWINGS

The invention is described in even more detail below based on exemplary embodiments. They show.

DETAILED DESCRIPTION OF THE PRESENT INVENTION

Figure 1:
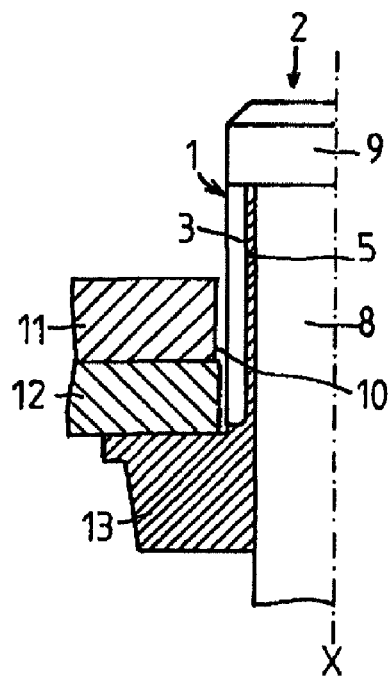
FIG. 1 illustrates a rivet according to the invention in partial cross-sectional representation.

FIG. 1 shows in partially cross-sectional representation a rivet 2 according to the invention in blind rivet embodiment. The rivet 2 comprises a sleeve 1, on the shank 5 of which a widened preformed head 13 is integrally shaped. With the situation shown in FIG. 1, the rivet 2 is used to connect two workpieces 11, 12 to one another. To this end the workpieces 11, 12 are respectively provided with a bore, which can lead to a radial gap 10, as the case may be, also gaps of different size, existing between the sleeve 1 and the workpieces 11, 12. Starting from the position shown in FIG. 1, if the rivet 2 is now placed through the exertion of a tensile force along an axis X of the rivet mandrel 8, the sleeve 1 is deformed during contact with a head 9 of the rivet mandrel 8 in the area of the shank 5 at first radially outwards and closes the gap 10 to the workpieces 11 or 12. This deformation in the radial direction is achieved through outside indentations 3 in the shank 5 of the sleeve 1, since the indentations 3 lead to a reduction of a dent resistance and buckling resistance of the shank 5. The indentations 3 start approximately in the area of the preformed head 13 and have a length that corresponds at least to a sum of the workpiece thicknesses. It is thus ensured that a gap 10 between the sleeve 1 and the workpiece 11 as well as between the sleeve 1 and the workpiece 12 is closed. An analogous sequence is given when the head 9 of the rivet mandrel 8 is embodied to be wider than the bores, which can be the case when the workpieces 11, 12 are accessible from both sides.

Figure 2:
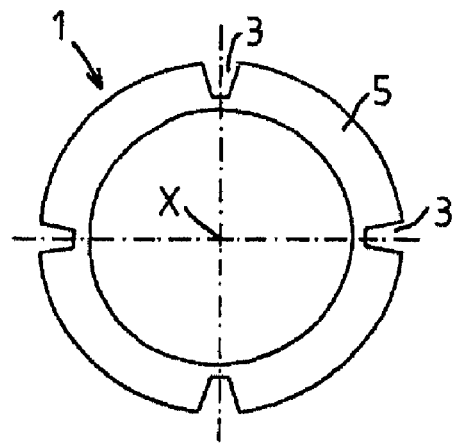
FIG. 2 illustrates a shank of a rivet according to the invention in cross section.

FIG. 2 shows a cross section of a shank 5 according to FIG. 1 in more detail. The cylindrical shank 5 is provided on the outside with four indentations 3, which are respectively offset by 90° with respect to one another. Accordingly, the indentations 3 are arranged in a rotationally symmetrical manner about an axis X of the sleeve 1. In order to achieve the most uniform possible expansion of the sleeve 1 in all directions, the indentations 3 have an identical polygonal or rounded shape. However, in principle it is also possible for the shank 5 to be provided with indentations 3 with a different shape, for example, with a wedge shape. It is also possible to provide indentations 3 of a different shape on a shank 5.

Figure 3:
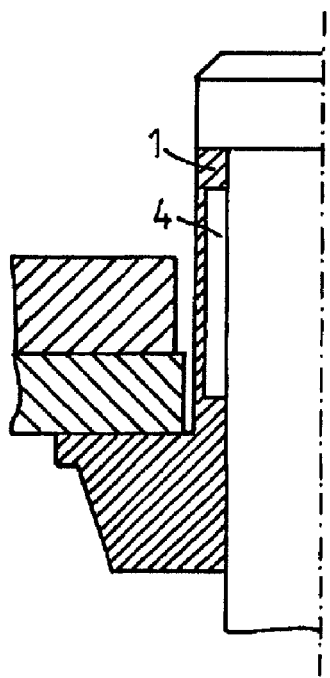
FIG. 3 illustrates a rivet according to the invention, the shank of which has slots on the inside, in partially cross-sectional representation.
Figure 4:
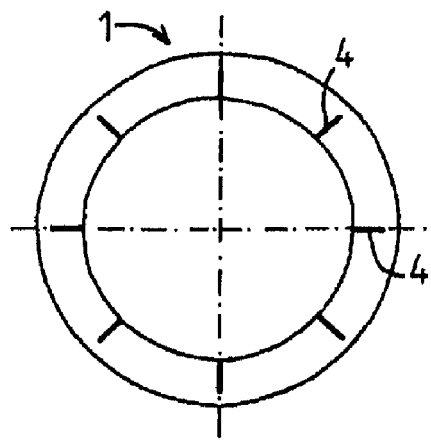
FIG. 4 illustrates a shank of a rivet according to FIG. 3 in cross section.

FIG. 3 shows an alternative embodiment. In this case instead of outside indentations 3 (see FIG. 1 and FIG. 2), inside slots 4 are provided, which extend radially into the shank 5, but do not penetrate through it. Slots 4 of this type can be inserted in the shank 5 of a sleeve 1 by shaping in a simple manner. The slots 4 can thereby also be subsequently closed to the inside without their effect during the placement of a rivet 2 being lost (FIG. 4). The slots 4 do not necessarily need to be inserted either on the inside or on the outside, but can also be present on the inside as well as on the outside.

Figure 7:
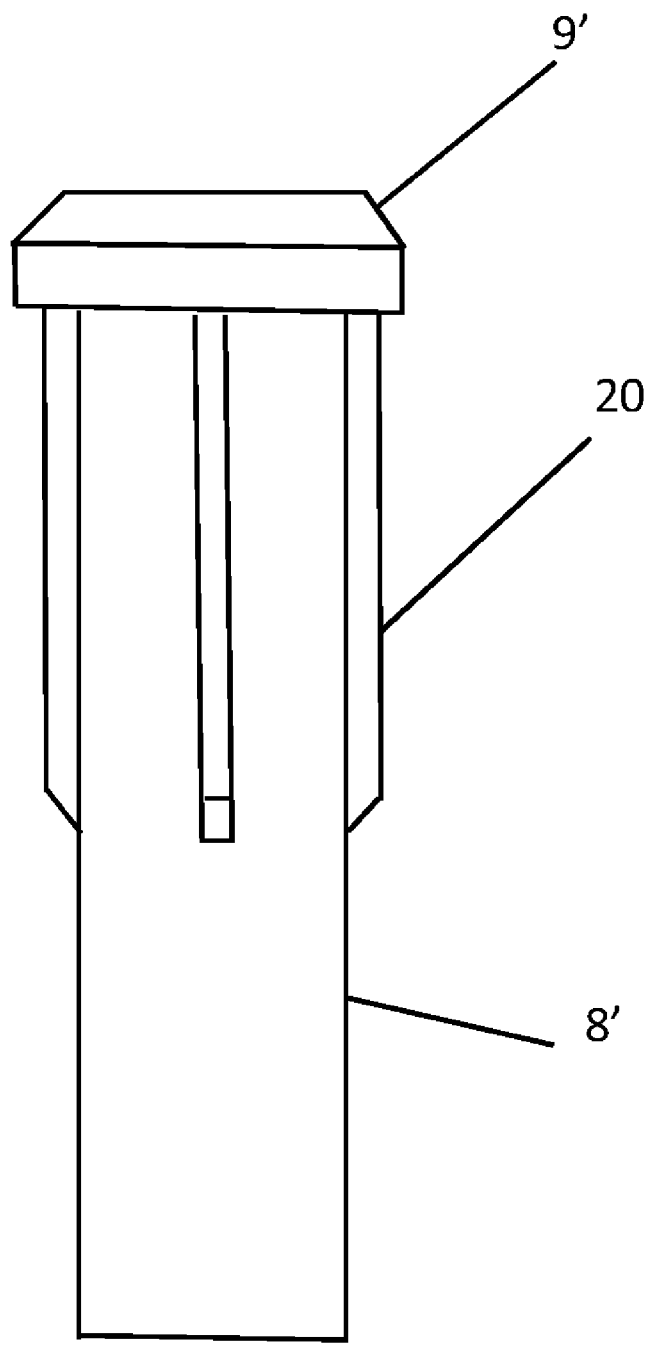
FIG. 7 illustrates a rivet having ribs according to aspects of the invention.

Although not shown in FIG. 1 and FIG. 2, rivet mandrels with ribs preferably connecting on the head of the rivet mandrel can be used (See FIG. 7). In this case, an outer diameter of the rivet mandrel in the rib area is greater than an inner diameter of the sleeve in the shank area. A radial expansion of the shank can thus be additionally supported. In order to facilitate drawing in, the ribs preferably have a beveled or wedge-shaped end. As shown in FIG. 7, a rivet mandrel 8' includes ribs 20 connecting on the head 9' of the rivet mandrel 8'.

In order to facilitate the formation of a driven head, it can be provided that the sleeve 1 in the area of an end lying opposite the preformed head 13 adjoining the indentation 3 and/or the slot 4 or spaced apart therefrom has radial recesses or ribs, which are preferably shaped such that a diameter of the driven head is at least 1.4 times the diameter of the rivet mandrel 8.

In particularly preferred embodiments of the invention in addition to the indentations 3 or the slots 4 on the outside at least one predetermined breaking point 6 or predetermined deformation point 7 is provided in the shank 5 of a sleeve 1. Predetermined breaking points 6 or predetermined deformation points 7 starting from the head 9 of the rivet mandrel 8 are thereby arranged in a first partial section, even before the indentations 3 or slots 4, which are arranged in a second partial area (see FIGS. 5a and 6a).

Figure 5A:
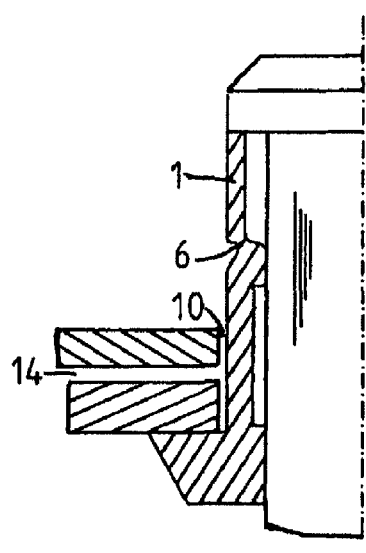
FIG. 5a illustrates a rivet according to the invention, the sleeve of which has a predetermined breaking point on the outside, in partial cross-sectional representation.
Figure 5B:
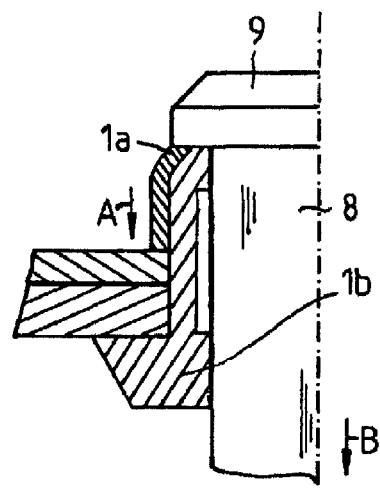
FIG. 5b illustrates the rivet from FIG. 5a after the start, but before the end of the placement process.

If now, as shown in FIG. 5b, the rivet mandrel is drawn along direction B and in this manner an axial tensile force is exerted on an end part of the sleeve 1 or the shank 5 thereof, a break of the sleeve 1 into two parts 1a and 1b occurs in the area of the predetermined breaking point 6 and the part 1a is pushed over the part 1b of the sleeve 1. In the course of the placement process this means that an axial force is exerted along direction A on the workpieces to be connected, whereby a lateral gap 14 (FIG. 5a) is closed, even before an expansion of the sleeve part 1b and finally a formation of a driven head occurs. In this case, the lateral gap 14 as well as the radial gap 10 in FIG. 5a can be closed during placement of the rivet 2. A connection produced in this manner in accordance therewith is characterized by a very high load-carrying capacity.

Figure 6A:
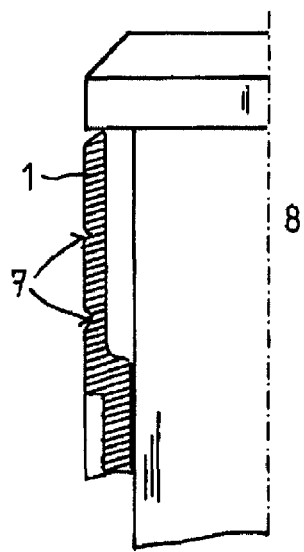
FIG. 6a illustrates a rivet according to the invention, the sleeve of which has predetermined deformation points on the outside, in partial cross-sectional representation.
Figure 6B:
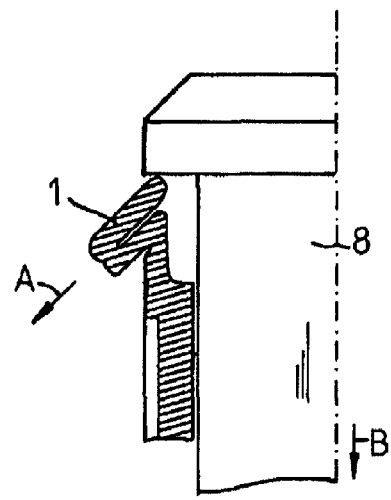
FIG. 6b illustrates the rivet from FIG. 6a during a placement operation, but before the end of the same in partially cross-sectional representation.

A similar effect can be achieved through predetermined deformation points 7, as shown in FIG. 6a. In this case with the exertion of a tensile force in direction B, first a buckling of the sleeve 1 occurs so that a truncated cone is formed in the end area of the sleeve 1. During the further drawing in of the rivet mandrel 8 in the direction B, this ensures that a force is exerted essentially in direction A on the workpieces to be connected. Also in this case lateral gaps 14 between the workpieces to be connected can be closed and highly loadable connections can be achieved.

A cross-sectional area and a number of indentations 3 or slots 4 is preferably selected such that during the drawing in of the rivet mandrel 8 at first essentially the shank 5 is deformed radially outwards and only subsequently the free end of the shank 5 is deformed to form a driven head.

In connection therewith it can also be provided for the same reasons that the indentations/slots extend only over a partial area of the shank 5, namely between the preformed head 13 and that area of the shank 5 which is deformed to form a driven head (see FIG. 5a).

Although the concept according to the invention was shown for blind rivets by way of example, this can also be applied to pop rivets. Also modifications of the above examples, for example, sleeves embodied in a multiple-part manner with separate shank and preformed head, are possible within the scope of the invention. It is likewise also easily possible to apply the concept according to the invention to locking ring bolts.

The invention claimed is:
1. A rivet for connecting workpieces, comprising:
a sleeve with a shank and a widened preformed head;
a rivet mandrel with a head,
an end of the shank lying opposite the preformed head being deformable to form a driven head when the rivet mandrel is drawn into the sleeve;
the shank including several at least one of axially running indentations and axially running slots structured and arranged for radial expansion of the shank toward the workpieces during the placement of the rivet;
the rivet mandrel including longitudinally extending external ribs adapted to radially expand the sleeve, wherein the ribs are arranged to bear against the sleeve in areas between the several at least one of indentations and slots.

2. The rivet in accordance with claim 1, wherein the rivet is structured as a blind rivet.

3. The rivet in accordance with claim 1, wherein the several at least one of indentations and slots are arranged on an outside of the shank.

4. The rivet in accordance with claim 1, wherein the several at least one of indentations and slots are arranged on an inside of the shank.

5. The rivet in accordance with claim 1, wherein the shank the several at least one of indentations and slots comprises at least three indentations and/or slots.

6. The rivet in accordance with claim 1, wherein the several at least one of indentations and slots run parallel to a sleeve axis (X) and are symmetrically arranged around the sleeve axis.

7. The rivet in accordance with claim 1, wherein the several at least one of indentations and slots run approximately from an area in which the shank connects to the preformed head.

8. The rivet in accordance with claim 1, further comprising at least one predetermined breaking point located on an outside of the sleeve.

9. The rivet in accordance with claim 8, wherein the at least one predetermined breaking point is structured and arranged radially circumferentially on the sleeve so that an end part of the sleeve is axially displaceable around a remaining part of the sleeve through application of a force in a direction of the sleeve axis (X).

10. The rivet in accordance with claim 1, further comprising at least one predetermined deformation point located on an outside of the sleeve.

11. The rivet in accordance with claim 10, wherein the at least one predetermined deformation point is structured and arranged radially circumferentially on the sleeve so that an end part of the sleeve is deformable around a remaining part of the sleeve to form a truncated cone through an application of a force in the direction of the sleeve axis (X).

12. The rivet in accordance with claim 1, wherein the sleeve comprises guide lugs for the ribs arranged on an end of the sleeve adjacent the ribs.

13. The rivet in accordance with claim 1, wherein the ribs connect on the head of the rivet mandrel.

14. The rivet in accordance with claim 10, wherein the ribs comprise a wedge-shape directed toward the preformed head.

15. The rivet in accordance with claim 1, wherein the sleeve in an area of an end located opposite the preformed head comprises one of radial recesses and ribs that are one of adjoining and spaced from the several at least one of indentations and slots.

16. A method for connecting workpieces provided with bores with the rivet in accordance with claim 1, comprising:
   positioning the rivet in the bores of the workpieces so that a gap remains between a shank of the rivet and at least one of the workpieces;
   radially expanding the shank towards the workpieces, thereby at least one of simultaneously and subsequently forming the driven head within the gap.

17. The method in accordance with claim 16, wherein the rivet is a blind rivet.

18. The method in accordance with claim 16, wherein two workpieces are connected to one another.

19. A method for connecting workpieces provided with bores, comprising:
   aligning bores of at least two workpieces to be joined;
   positioning a rivet comprising a rivet mandrel and a sleeve having a shank in the aligned bores so that there is a gap between a the shank of the rivet and at least one of the workpieces;
   radially expanding the shank along at least one axial void, thereby at least one of simultaneously and subsequently forming a driven head within the gap,
wherein the rivet mandrel includes longitudinally extending external ribs adapted to radially expand the sleeve.

20. The method in accordance with claim 19, wherein the at least one axial void comprises at least one of an axial indentation and an axial slot.

* * * * *